United States Patent [19]
Brown et al.

[11] Patent Number: 6,029,949
[45] Date of Patent: Feb. 29, 2000

[54] HIGH PERFORMANCE BUTTERFLY VALVE

[75] Inventors: Robert Joseph Brown, Cookeville; William John Mabery, Gainesboro; Harold Taylor Gentry; Gerald Patrick McDermott, both of Cookevile, all of Tenn.

[73] Assignee: Flowserve Corporation, Irving, Tex.

[21] Appl. No.: 08/422,795

[22] Filed: Apr. 17, 1995

[51] Int. Cl.[7] .................................................. F16K 1/22
[52] U.S. Cl. ............................................................ 251/305
[58] Field of Search .............................................. 251/305

[56] References Cited

U.S. PATENT DOCUMENTS

| | | |
|---|---|---|
| 3,080,145 | 3/1963 | Swain . |
| 3,677,297 | 7/1972 | Walton . |
| 3,963,213 | 6/1976 | Brattberg . |
| 4,037,819 | 7/1977 | Kindersley . |
| 4,058,290 | 11/1977 | Nelimarkka . |
| 4,605,201 | 8/1986 | Miyazaki . |
| 4,759,530 | 7/1988 | Iff . |
| 4,770,393 | 9/1988 | Hubertson ............................ 251/305 X |
| 4,809,948 | 3/1989 | Gardner et al. . |
| 5,125,624 | 6/1992 | Yohner . |
| 5,158,265 | 10/1992 | Miyairi .................................... 251/305 |

*Primary Examiner*—John Fox
*Attorney, Agent, or Firm*—Killworth, Gottman, Hagan & Schaeff, L.L.P.

[57] ABSTRACT

An improved high performance butterfly is provided. The valve includes a valve body, a disk, an annular seat and a shaft. The disk has at least a portion of the circumference of the peripheral edge notched or beveled to provide better clearance of the annular seat and to reduce wear on the seat. The centerline of the shaft, corresponding to the center of rotation of the disk, is slightly offset from the centerline of the valve.

8 Claims, 4 Drawing Sheets

FIG. 4
FIG. 5
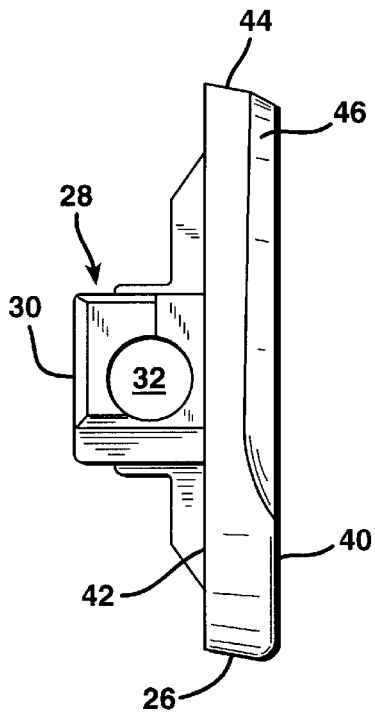
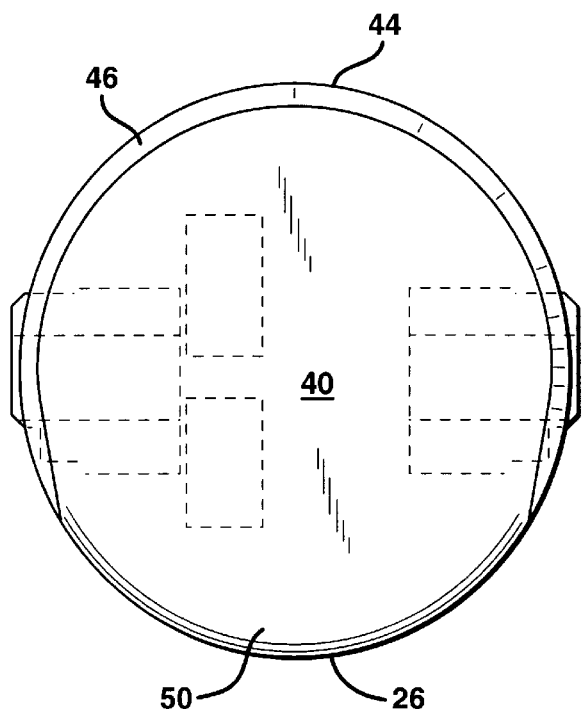
FIG. 6
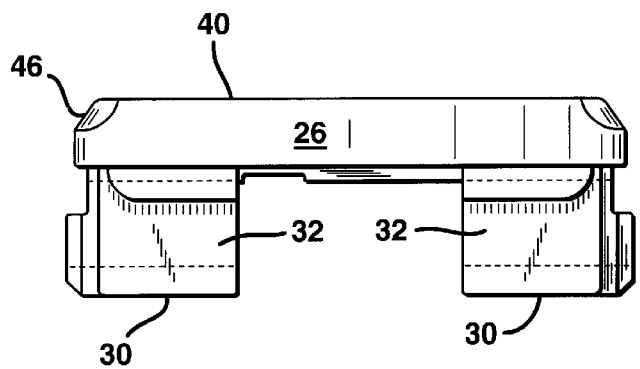

HIGH PERFORMANCE BUTTERFLY VALVE

BACKGROUND OF THE INVENTION

The present invention relates to high performance butterfly valves, and more particularly, to high performance butterfly valves wherein the pivotable disk which is rotated to open and close the valve has a partially beveled outer periphery.

Butterfly valves, in general, are well known and widely employed due to their simplicity of construction and relatively inexpensive cost as compared to more complicated and detailed plug and ball valves. In recent years, the demand has been increased for butterfly valves containing an offset axis of rotation of the disk. In an offset rotation valve, the axis of rotation of the disk is slightly offset from the center of the bore through the valve. Offset valves provide a camming action to the disk when coming both into and out of a sealing arrangement with the valve seats. So that less force is required to open and close the valve.

However, one detraction to the use of offset rotation butterfly valves is extensive contact between the disk and the valve seats which can cause an undue amount of wear on the seats. If a metal or other relatively rigid material is employed as the valve seat, the camming action of an offset valve may wear or damage the seat as the disk is brought into sealing arrangement with the seat. Wear or damage along the sealing surface will eventually lead to leakage of the valve. Accordingly, the effective lifetime of the valve is reduced.

Butterfly valves, including arrangements for reducing the extensive contact between the disk and the valve seats during offset rotation, are known. U.S. Pat. No. 4,058,290 to Nelimarkka and U.S. Pat. No. 4,037,819 to Kindersley both disclose butterfly valves with arrangements for reducing the contact between the disk and the valve seats. Nelimarkka discloses a cylindrical angle-transported disc so that disk appears to be a cross-section of a ball. The end edges are angled at an angle greater than 0° with respect to a line drawn perpendicular to the faces of the disk.

Kindersley, on the other hand, discloses a conical angle transported disk so that the disk appears to be the diagonal cross-section of a cone. Again, the end edges are angled at an angle greater than 0° with respect to a line drawn perpendicular to the disk faces. Both Nelimarkka and Kindersley have the angled ends to allow the disk to slide into position. However, both valves have proven to be less than satisfactory in reducing the contact between the disk and valve seat during rotation of the disk.

Accordingly, the need remains for an improved high performance butterfly valve with reduced contact between the disk and the valve seat during rotation of the disk.

SUMMARY OF THE INVENTION

This need is met by the present invention whereby a high performance butterfly valve is provided. The butterfly valve of the present invention includes a perpendicular angle transported disk that appears to be the diagonal cross-section of a round rod and partially notched or beveled outer periphery on the disk face and an offset shaft and center of rotation. This partial notch reduces the excessive contact between the disk face and the valve seat common in offset rotation valves. As a result, wear of the valve seats is reduced and the lifetime of the valve is extended.

According to the present invention, a high performance butterfly valve is provided. The valve comprises a valve body having a substantially circular bore. The bore is adapted for fluid flow through the bore, and the valve body has a centerline through the bore. The valve further includes a disk adapted for movement between an open position which allows fluid flow through the circular bore and a closed position wherein fluid flow through the circular bore is restricted. The disk has an outer face and an inner face with the outer face having a peripheral edge. At least a portion of the peripheral edge is notched, preferably about three-fourths of the circumference of the peripheral edge, and the inner face is adapted for mounting the disk in the circular bore. The disk also has a centerline corresponding to the centerline of the bore.

The valve of the present invention also includes an annular valve seat mounted in the valve body to provide a sealing surface extending into the circular bore for sealing the disk when the disk is in a closed position. Preferably, the seats of the present invention are metal seats. A shaft for mounting the disk in the circular bore and for rotating the disk between open and closed positions is also included in the valve of the present invention. The shaft has a centerline corresponding to the center of rotation of the disk. To provide the offset rotation of the present invention, the centerline of the shaft, and thus, the center of rotation of the disk, is offset from the centerline of the bore and the disk.

In an additional embodiment of the present invention, a disk for a high performance butterfly valve is provided. The disk comprises a disk portion having an outer and inner face and a perpendicular angle transported disk that appears to be the diagonal cross-section of a round rod. The outer face has a peripheral edge, at least a portion of which is notched. Preferably, about three-fourths of the circumference of the peripheral edge is notched. The disk has a centerline which corresponds to the centerline of the disk portion. The inner face has a mounting portion adapted to receive the shaft from a butterfly valve, preferably a hub containing a shaft channel. The mounting portion also has a centerline which corresponds to the center of rotation of the disk. And, the centerline of the mounting portion is offset from the centerline of the disk.

Accordingly, it is an object of the present invention to provide a high performance butterfly valve which provides reduced seat wear and longer valve lifetime. It is a further object of the present invention to provide a high performance butterfly having an offset center of rotation and a disk having a perpendicular angle transported disk that appears to be the diagonal cross-section of a round rod and a notched peripheral edge.

BRIEF DESCRIPTION OF THE DRAWINGS

FIG. 4 is a top view of the disk of the butterfly valve of the present invention.

FIG. 5 is a front view facing the outer face of the disk of the butterfly valve of the present invention.

FIG. 6 is a side view of the disk of the butterfly valve of the present invention.

DETAILED DESCRIPTION OF THE PREFERRED EMBODIMENTS

Figure 1:
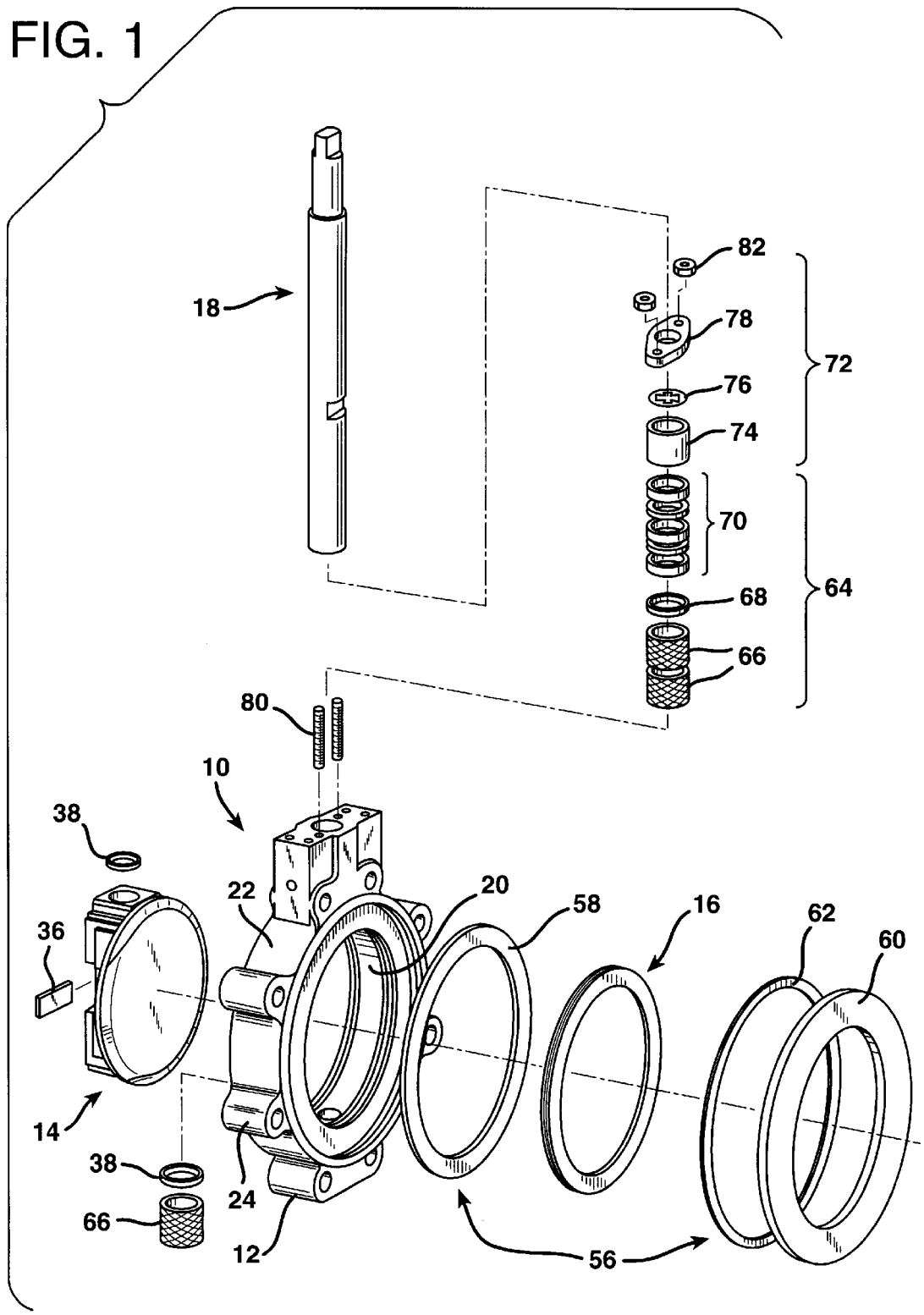
FIG. 1 is an exploded perspective view of the butterfly valve of the present invention showing the various elements of the preferred valve and their location within the valve.
Figure 3:
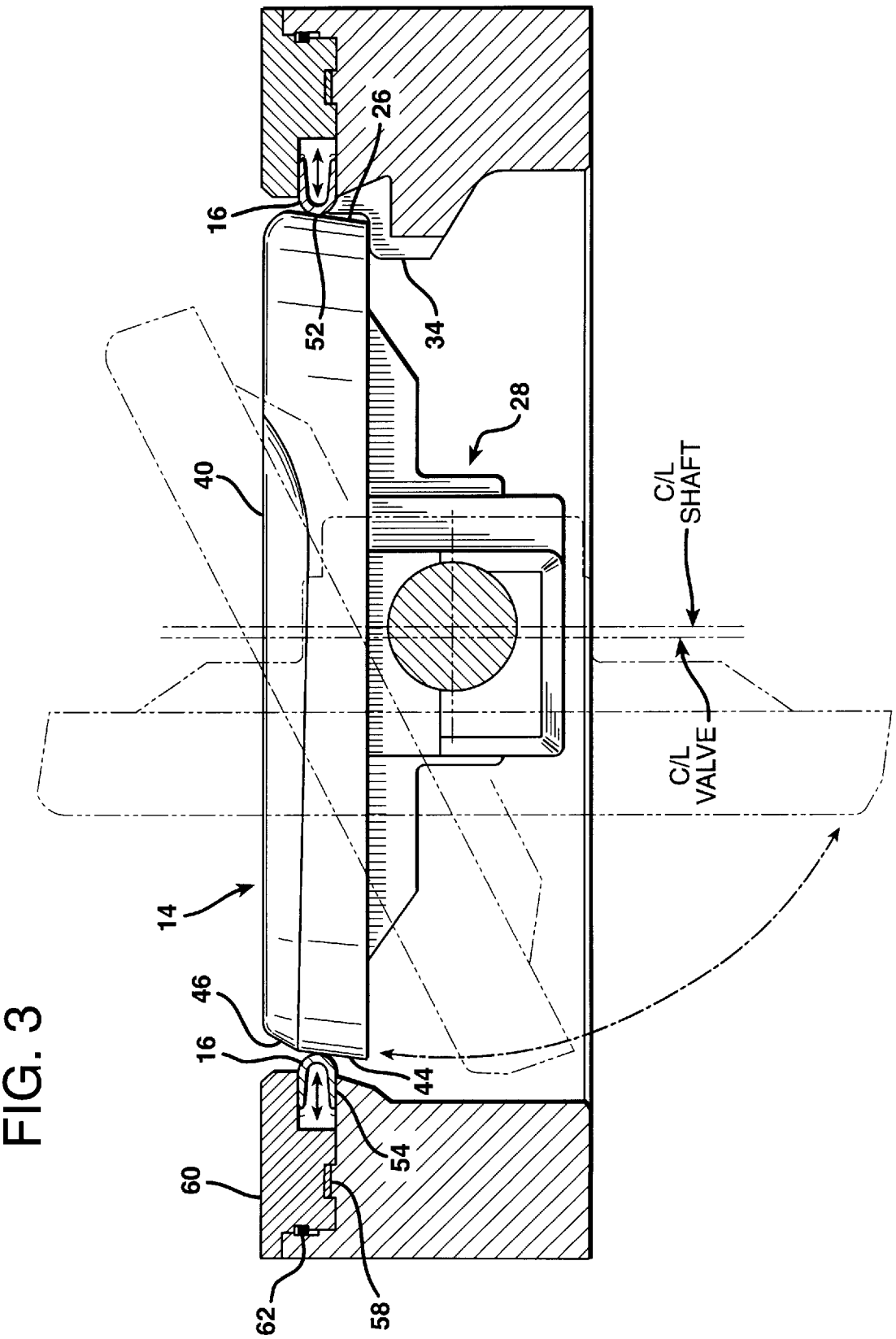
FIG. 3 is a cut-away top view of the butterfly valve of the present invention taken along line 3—3 in FIG. 2.

Referring to FIG. 1, there is seen a preferred embodiment of the butterfly valve of the present invention. The valve 10 includes a valve body 12, a disk 14, an annular valve seat 16 and a shaft 18. Valve body 12 has a substantially circular bore 20 through which fluids may flow. Valve body 12 may be formed of various metals and alloys, such as carbon or stainless steel. In addition, as can be seen in FIG. 3, valve body 12 has a centerline C/L VALVE through the circular bore. This centerline corresponds to the center of the bore 20 and the valve 10.

Valve body 12 may be formed in either of two different styles. Valve body 12 may be in the form of a lug body 22 as shown in FIG. 1. A lug body style includes flange apertures 24 adapted to allow the flange of a piping system into which the valve 10 is incorporated. In other words, lug body 22 is bolted or otherwise attached directly to the piping of a fluid flow system. In an alternate design, valve body 12 may be in the form of a wafer style body (not shown). A wafer style is nearly identical to lug body 24, the only differences being the absence of flange apertures 24. A wafer style body is designed to be affixed between two piping flanges bolted or otherwise affixed to each other. Thus, the valve 10 would be held in place by the two flanges on either side of the valve 10.

The valve 10 of the present invention also includes disk 14. Turning to FIGS. 3–6, there is seen the preferred disk 14 of the present invention. The disk 14 includes a disk portion 26 and a mounting portion 28 for mounting the disk 14 in the circular bore 20. Disk 14 is a perpendicular angle transported disk that appears to be the diagonal cross-section of a round rod. Disk 14 includes a centerline of the disk which corresponds or is in the same place as the centerline of the valve C/L VALVE. Mounting portion 28 may includes a hub 30 and a shaft hole 32 for receiving shaft 18. Shaft hole 32, and, thus, shaft 18 has a centerline C/L SHAFT. Mounting portion 28 is arranged so that the centerline of the shaft C/L SHAFT is offset slightly from the centerline of the valve and disk C/L VALVE. This arrangement provides the offset rotation of the valve. Disk 14 is adapted to rotate between an open position wherein fluid is allowed to pass through circular bore 20 and a closed position wherein fluid flow is restricted or prevented. To prevent over-rotation of the disk 14, a stop lug 34 is preferably provided on valve body 12.

As seen in FIG. 1, when connecting disk 14 to shaft 18, a shaft pin 36 and a thrust bearing 38 are preferably provided. Shaft pin 36 connects disk 14 to shaft 18 and thrust bearing 38 maintains the disk and shaft in proper vertical alignment as well as acts as a bearing for the rotation of shaft 18 and disk 14. Of course, the described mounting is a preferred embodiment and other mounting arrangements may be employed without departing from the scope of the invention.

Returning to FIGS. 3–6, disk 14 includes an outer face 40 and an inner face 42. Mounting portion 28 is attached to inner face 42. Outer face 40 includes a peripheral edge 44. As stated earlier, butterfly valves including an offset center of rotation experience increased wear of the valve seats due to a camming action forcing the disk both into and out of a sealing arrangement with the valve seats.

To reduce the wear of the seat 16, the valve 10 of the present invention includes a bevel or notch 46 on at least a portion of the peripheral edge 44 on disk 14. Seat 16 extends into bore 20 a slightly greater distance than the edge 44 of disk 14 when in a sealing arrangement. Thus, when disk 14 is brought into a sealing arrangement with seat 16, seat 16 is forced to flex or distort to a small amount. This distortion will eventually cause seat 16 to wear. Notch 46 allows the disk to more easily slide into and out of sealing arrangement with seat 16 by providing clearance between disk 14 and seat 16 on all but a small portion of edge 44. Thus, seat 16 flexes or distorts less than without the notched edge 46. As a result the valve 10 of the present invention has a longer lifetime on the average than prior art valves. This feature is a significant improvement over prior art valves, such as U.S. Pat. Nos. 4,058,290 and 4,037,819 to Nelimarkka or Kindersley, respectively. Neither Nelimarkka nor Kindersley disclose a disk with at least a portion of the circumference of the outer peripheral edge being notched or beveled.

Notch 46 is formed along at least a portion of the peripheral edge 44. Notch 46 is preferably formed along at least about one-half of the circumference of peripheral edge 44 of disk 14 and more preferably on at least about three-fourths of the circumference of peripheral edge 44. Preferably, the portion of peripheral edge 50 on which notch 46 is not formed is that portion of disk 14 which contacts stop lug 34 when disk 14 is in a closed position. Disk 14 is preferably formed of a metal or alloy material.

Turning to FIGS. 1 and 3, valve 10 is sealed by valve seat 16. Valve seat 16 is an annular ring mounted in valve body 12 thereby providing a sealing surface 52 which extends into bore 20. Sealing surface 52 provides a seal between the seat 16 and the disk 14 when disk 14 is in a closed position. In addition, seat 16 provides a sealing surface 54 with the valve body 12. In this manner, fluid flow through bore 20 is prevented when the disk 14 is in a closed position. Seat 16 is preferably a metal or alloy material. However, in various applications, seat 16 may also be a polymer or plastic seat or a metal or alloy material coated with a polymer material such as PFA TEFLON available from the E.I. DuPont de Nemours Company, of Wilmington, Del.

Referring to FIG. 1, seat 16 is held in place and sealed by seat packing 56. Seat packing 56 may be any known arrangement suitable for sealing and locking seat 16 in valve body 12. Preferably, seat packing comprises a gasket seal 58, a retainer ring 60, and a lock ring 62. Retainer ring 60 functions to hold seat packing 56, including seat 16, lock ring 62 and gasket seal 58 in valve body 12. Retainer ring 60 is preferably a metal or alloy material. Lock ring 62 functions to lock or hold retainer ring 60 into place. Lock ring 62 is preferably a metal or alloy material. Lastly, gasket seal 58 functions to seal between the retainer ring 60 and the body 12. Preferably, gasket seal 58 is a graphitic material such as GRAFOIL available from the Union Carbide Company. Of course, one of ordinary skill in the art will recognize that various other seat packing arrangements may be employed without departing from the scope of the invention.

Shaft 18 is provided to mount disk 14 in the circular bore 20 and to rotate disk 14 between open and closed positions. Again, as seen in FIG. 4, shaft 18 has a centerline C/L shaft which is slightly offset from the centerline of both the valve and disk C/L VALVE. Turning to FIG. 1, shaft 18 is both sealed and rotatably mounted in the valve body 12 and disk 14 by shaft packings 64. Shaft packings 64 may comprise any known arrangement for sealing and rotatably mounting shaft 18.

Preferably, shaft packing 64 comprises shaft bearing 66 for holding shaft 18 radially in position. A shaft bearing 66 is provided both above and below bore 20. Preferably, shaft bearing 66 is a metal or fiberglass material. Shaft packing 64 also includes thrust bearing 38 adjacent the lower shaft bearing 66 to hold disk 14 and shaft 18 in vertical position. Adjacent the upper shaft bearing 66 a thrust washer 68 is provided for supporting shaft packing 64. Preferably, thrust washer 68 is a metal or alloy material. Adjacent thrust washer 68 is packing set 70 which functions to seal the shaft 18. Preferably packing set 70 comprises a polymer material such as PFA TEFLON and/or GRAFOIL.

Valve 10 is also provided with an adjustment mechanism 72 for tightening the seal on shaft 18. Adjustment mechanism 72 includes a packing gland 74 adjacent packing set 70. Packing gland 74 functions to compress packing set 70 to increase the sealing force against shaft 18. Preferably, packing gland 74 is a metal or alloy material. Adjustment mechanism 72 also includes a grounding spring 76 to ground the shaft 18 to the valve body 12 and prevent the build-up of static charges.

Figure 2:
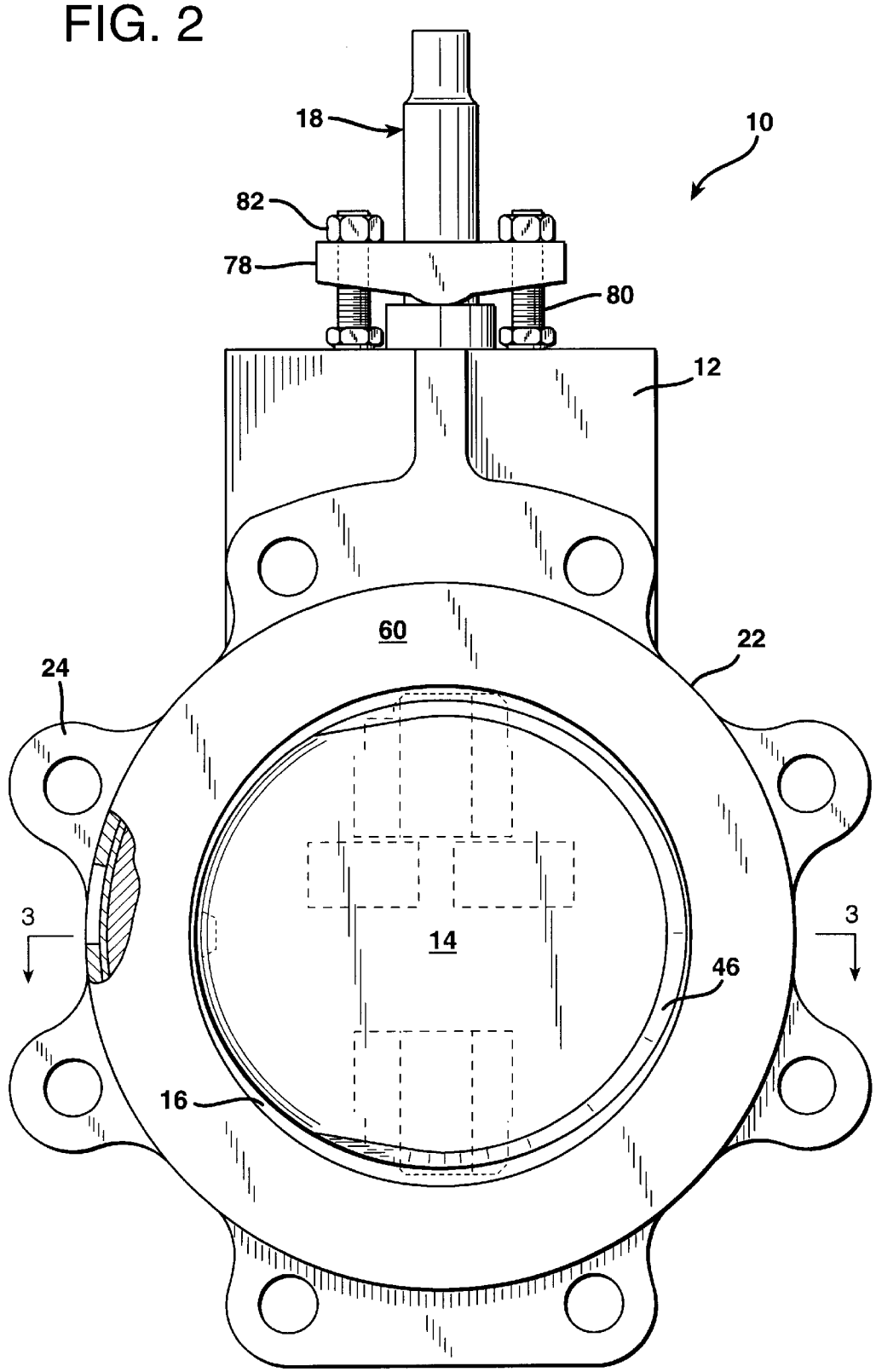
FIG. 2 is a side view of the assembled butterfly valve of the present invention.

Adjuster 78 is also provided in the valve 10. Adjuster 78 functions to compress packing gland 74 which in turn compresses packing set 70 thereby tightening the seal on shaft 18. Force is manipulated on adjuster 78 through the use of studs 80 and nuts 82. Rotation of nuts 82 causes the rotation of studs 80 which in turn manipulate the force adjuster 78 to apply force to gland 74. Of course, one of ordinary skill in the art will recognize that various other stem sealing and adjusting mechanisms may be employed without departing from the scope of the invention. The completely assembled valve 10 is shown in FIG. 2.

Having described the invention in detail and by reference to the preferred embodiment thereof, it will be apparent that modifications and variations are possible without departing from the scope of the invention which is defined in the appended claims.

What is claimed is:

1. A high performance butterfly valve comprising:

a valve body having a substantially circular bore, said bore being adapted for the fluid flow through said bore and having a centerline through said bore;

a disk adapted for movement between an open position thereby allowing fluid flow through said circular bore and a closed position wherein fluid flow through said circular bore is restricted, said disk having the share of a diagonal cross-section of a round rod and having an outer face and an inner face, said outer face having a peripheral edge, at least a portion of the circumference of said peripheral edge being notched, said inner face being adapted for mounting said disk in said circular bore, said disk having a centerline corresponding to the centerline of said bore;

an annular valve seat mounted in said valve body thereby providing a sealing surface extending into said circular bore for sealing said disk when said disk is in a closed position; and, a shaft for mounting said disk in said circular bore and for rotating said disk between open and closed positions, said shaft having a centerline corresponding to the center of rotation of said disk, said centerline of said shaft being offset from said centerline of said bore and said disk.

2. The butterfly valve as claimed in claim 1 wherein about three-fourths of the circumference of said peripheral edge of said disk is notched.

3. The butterfly valve as claimed in claim 1 wherein said valve body comprises a wafer style body.

4. The butterfly valve as claimed in claim 1 wherein said valve body comprises a lug style body.

5. The butterfly valve as claimed in claim 1 wherein said seats are metal seats.

6. A disk for a high performance butterfly valve comprising: a disk portion having the shape of a diagonal cross-section of a round rod and having an outer face and an inner face, said outer face having a peripheral edge, at least a portion of the circumference of said peripheral edge being notched, said disk having a centerline corresponding to the center of said disk portion, said inner face having a mounting portion adapted for receiving a shaft from a butterfly valve, said mounting portion having a centerline corresponding to the center of rotation of said disk, and said centerline of said mounting portion being offset from said centerline of said disk portion.

7. The disk as claimed in claim 6 wherein about three-fourths of the circumference of said peripheral edge of said disk portion is notched.

8. The disk as claimed in claim 6 wherein said mounting portion comprises a hub having channel adapted from receiving a shaft from a butterfly valve.

\* \* \* \* \*